United States Patent [19]
Lopreiato

[11] Patent Number: 6,039,376
[45] Date of Patent: Mar. 21, 2000

[54] FOREARM FURNITURE LEVERAGE STRAPS

[76] Inventor: Mark Anthony Lopreiato, 400 N. El Molino Ave., Apt. E, Pasadena, Calif. 91101

[21] Appl. No.: 08/977,976

[22] Filed: Nov. 25, 1997

[51] Int. Cl.[7] .................................................. B65D 63/18
[52] U.S. Cl. ............................ 294/152; 294/74; 294/157
[58] Field of Search ................................ 294/74, 77, 149, 294/152–157; 224/218–220, 267; 383/15, 16

[56] References Cited

U.S. PATENT DOCUMENTS

| | | | |
|---|---|---|---|
| 873,044 | 12/1907 | Hanson | 294/157 X |
| 2,508,795 | 5/1950 | Nielsen | 294/152 |
| 3,214,072 | 10/1965 | Brown | 294/157 X |
| 3,563,433 | 2/1971 | Yoshiura et al. | 294/157 |
| 4,431,226 | 2/1984 | Weilert | 294/152 X |
| 4,950,014 | 8/1990 | Smith | 294/152 |
| 5,102,178 | 4/1992 | Staats | 294/157 X |
| 5,503,448 | 4/1996 | Dewey | 294/157 X |
| 5,688,011 | 11/1997 | Gulley | 294/74 |

FOREIGN PATENT DOCUMENTS

| | | | |
|---|---|---|---|
| 952210 | 3/1964 | United Kingdom | 294/74 |
| 2050998 | 1/1981 | United Kingdom | 294/74 |

*Primary Examiner*—Johnny D. Cherry
*Attorney, Agent, or Firm*—William W. Haefliger

[57] ABSTRACT

Strap apparatus' for carrying objects includes a basic parallel and "X" configuration of a strap with strap elements extending outwardly from the base of the object being carried. In both the parallel and "X" configurations of use the strap apparatus' are disposed at the bottom of an object to be carried and outwardly extending strap portions are disposed at the sides of the object. The outer ends of the straps comprise carrying handles. Two people secure the handles to carry the object.

10 Claims, 6 Drawing Sheets

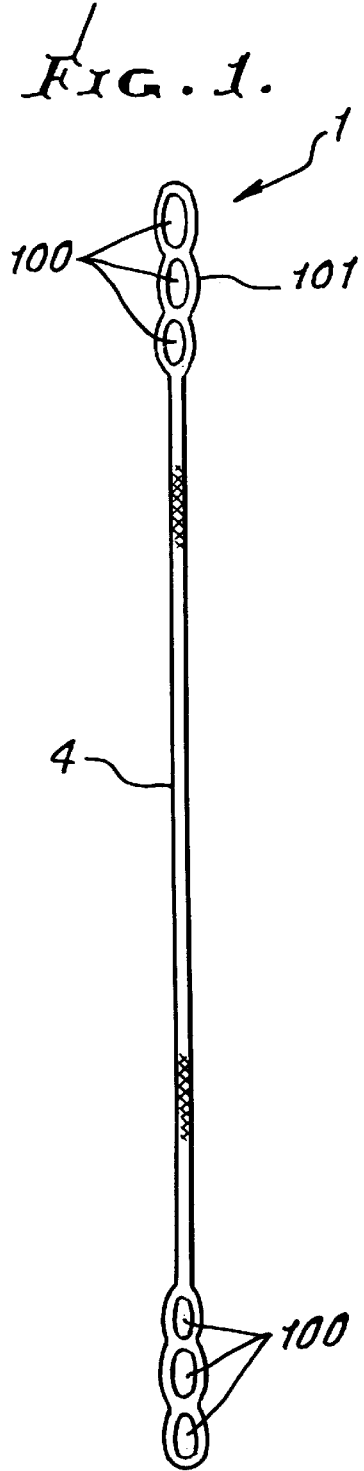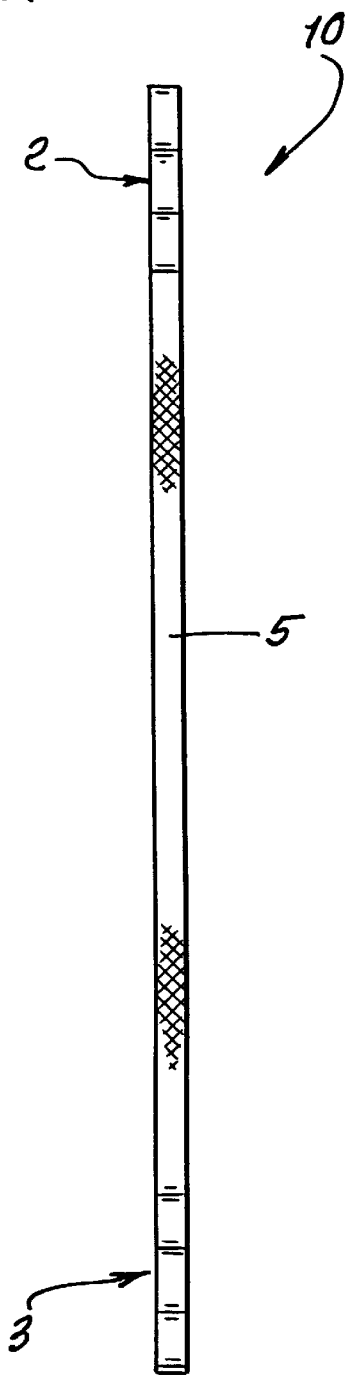

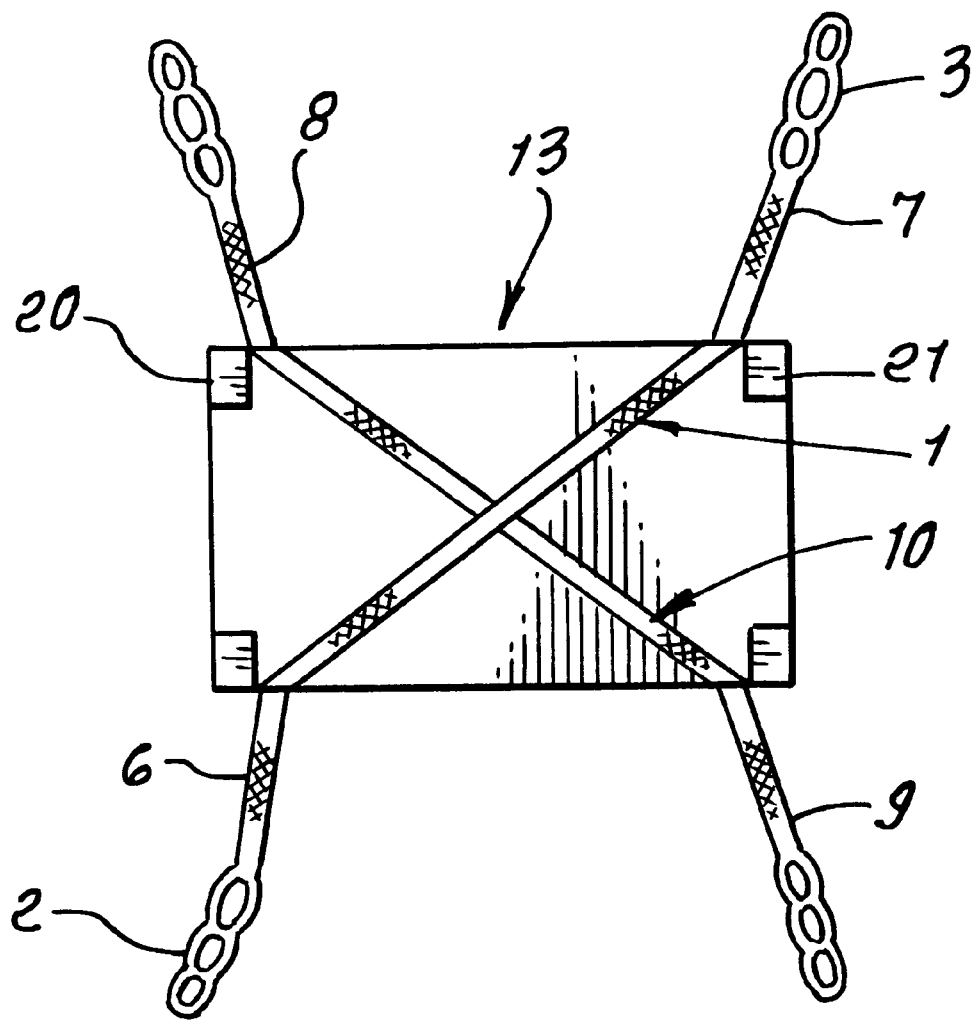

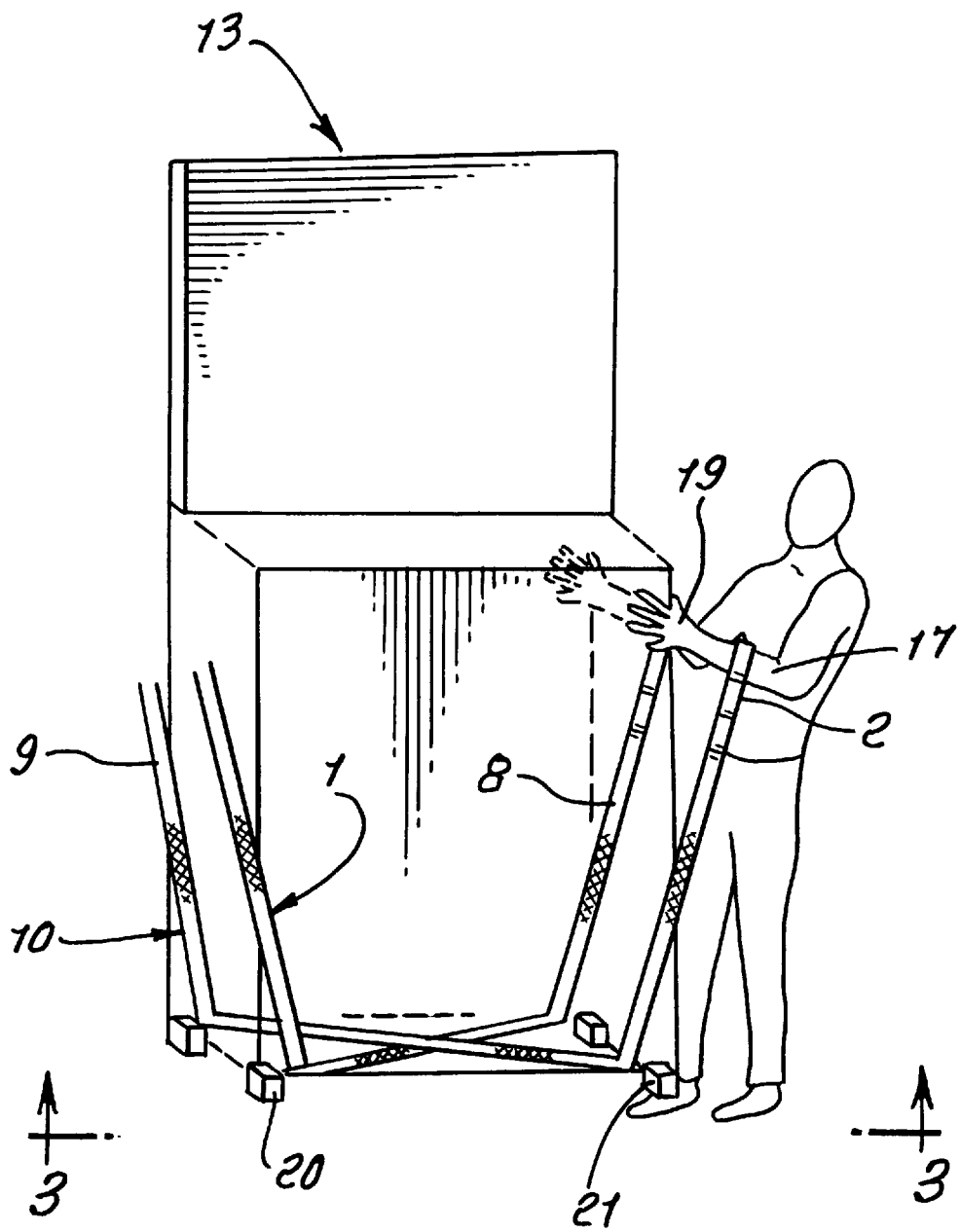

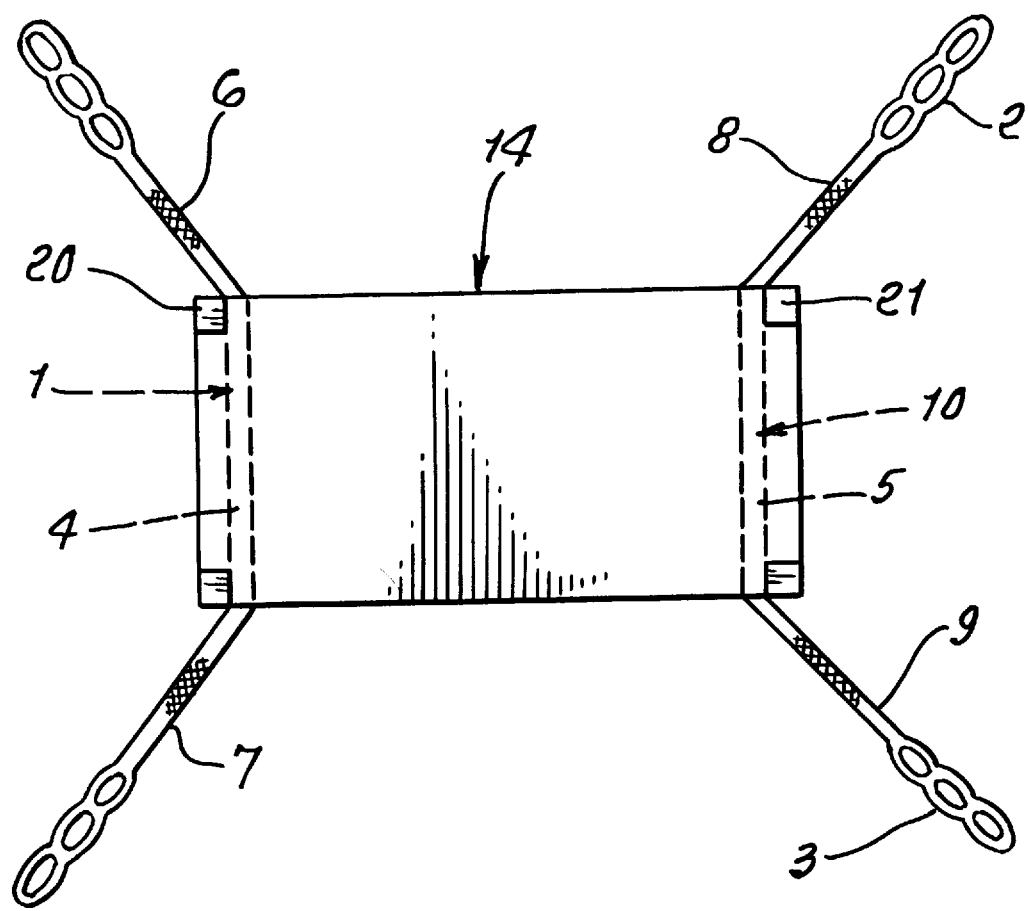

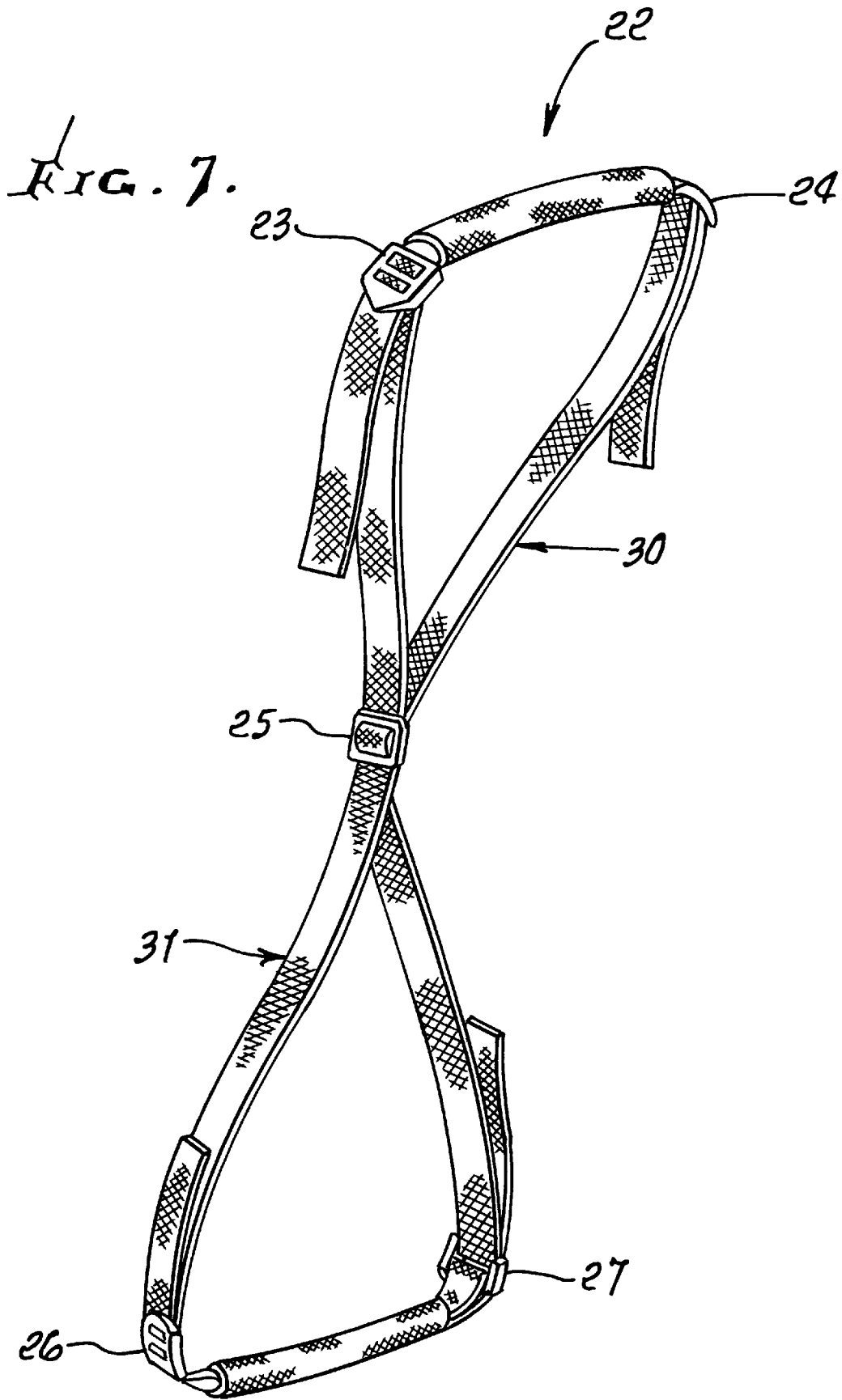

FOREARM FURNITURE LEVERAGE STRAPS

BACKGROUND OF THE INVENTION

1. Field of the Invention

This invention relates to straps for carrying elements or objects and, more particularly, to strap apparatus' which may be disposed to an object to support the object for carrying by two individuals.

2. Description of the Prior Art

For moving large and heavy objects, there are well known dolly elements typically of two different types. One type of dolly apparatus is simply a platform having four supporting wheels. The wheels typically are all casters to allow the dolly to move in virtually any direction with ease. An object to be moved is placed on the dolly and the dolly and object are then moved.

A second type of dolly apparatus is typically known as a hand truck. The hand truck type of dolly apparatus generally includes a pair of wheels and a plate disposed between the two wheels with a handle assembly extending generally perpendicular to the plate. The hand truck type of dolly apparatus may include straps to fasten an object to the plate and to carrying handles for moving. There are various other embodiments involved with the hand truck type of apparatus.

Neither of the two above described dollies are generally satisfactory for moving all types of objects, for example, neither of them may be used conveniently to move an armoire or a relatively large object, such as a china cabinet. Such objects as armoires and china cabinets are generally moved by two or more persons holding on to them in some manner.

The apparatus of the present invention comprises two strap apparatus' in which the straps are used at the bottom of the object to be transported and strap elements move outwardly and along the sides of the object to be transported. The "ends" of the strap elements comprise multiple (such as twelve) separate and selectable carrying handles, for arm engagement. Regarding different sizes of objects, selecting the proper handle will allow object movers (such as two workmen) to adjust strap apparatus to proper length. The strap apparatus' facilitates carriage of objects of large sizes and/or heavy weight as by two people, easily and efficiently.

BRIEF SUMMARY OF THE INVENTION

The invention described and claimed herein comprise-strap elements including a support such as a basic "X", when an overlapped, configuration of the straps is employed to be disposed at the bottom center of an object to be transported. Likewise, straps can be used in a parallel configuration, and disposed at opposite ends and, at the bottom of an object to be transported, as will appear. The strap elements extending outwardly from the basic parallel or bottom "X" portion are disposed at the sides of the object to be transported. The outwardly extending straps allow the strap apparatus' multiple, selectable handles to be individually and appropriately sized for the object being carried. Use of carrying handles at the ends of the straps allows an object to be readily carried by two people.

Among the objects of the present invention are the following:

to provide new and useful strap apparatus' for carrying objects;

to provide new and useful strap apparatus' having a basic parallel or "X" configuration disposed at the bottom opposite ends or center, respectively, of an object to be carried;

to provide new and useful strap apparatus' having strap elements disposed at the bottom and sides of an object to be carried;

to provide new and useful strap apparatus' to enable objects of various configurations to be carried by two persons; and to provide openings defined by the straps, at different positions along the strap lengths, for selective engagement by the workmen's arms, to best accommodate to object lifting and transport.

BRIEF DESCRIPTION OF THE DRAWINGS

FIG. 1 is a frontal view of the apparatus of the present invention in stretched out condition;

FIG. 2 is a side view of the FIG. 1 apparatus of the present invention;

FIG. 3 is a bottom plan view taken generally along lines 3—3 of FIG. 4;

FIG. 4 is a perspective view of the apparatus' of the present invention in a use environment;

FIG. 5 is a bottom plan view taken generally along lines 5—5 of FIG. 6;

FIG. 7 is a perspective view of prior strap apparatus.

DETAILED DESCRIPTION OF THE INVENTION

Figure 6:
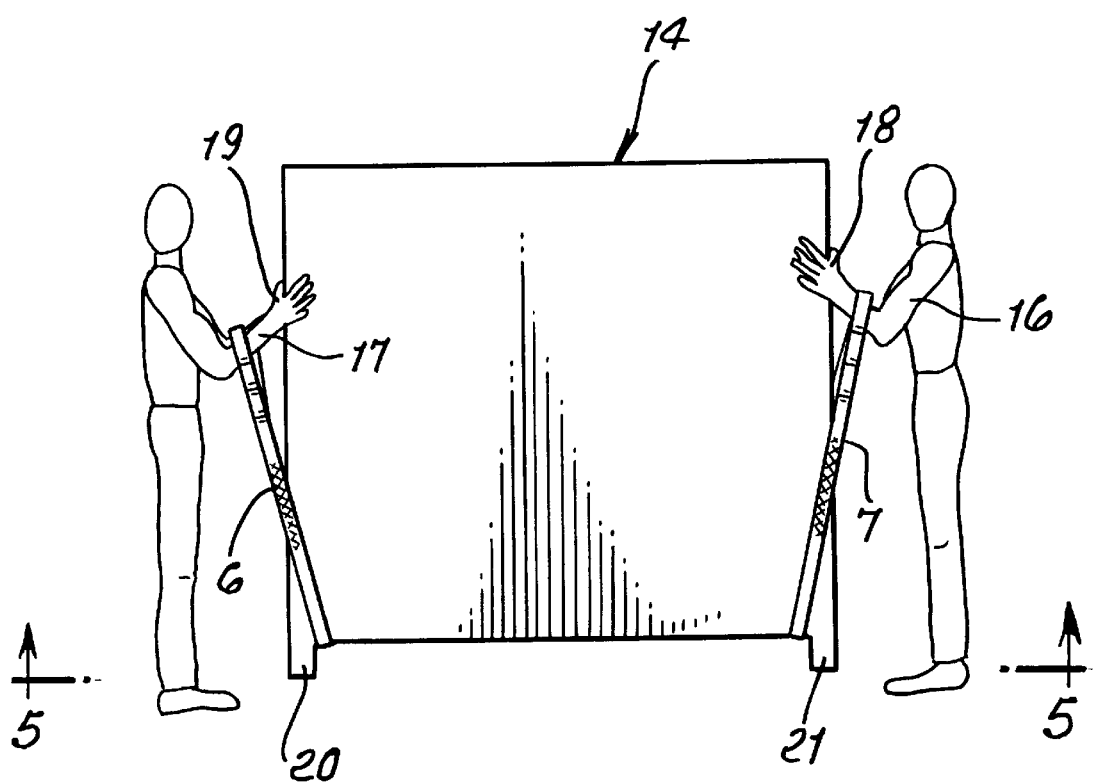
FIG. 6 is a perspective view of the apparatus' of the present invention in a second use environment.

Referring to FIGS. 1 and 2 two identical carrying strap apparatus' 1 and 10 are provided, and include, in general, multiple forearm handles as at locations 2 and 3. Any one handle on each side can be chosen by the user depending on the item being carried, such as will be discussed below in conjunction with FIGS. 1–6. Looping strap material 101 surrounds each handle opening, so that the handles fit the user's forearm, in use. As an example, three handle openings 100 are provided in series at each end of a strap 1 and at each end of strap 10.

Extending outwardly from the strap base portions 4 and 5 are side, i.e. intermediate, strap portions 6, 7, 8 and 9. The portions 6, 7, 8 and 9 extend to forearm handles 2 and 3. The forearm handles 2 and 3 are used to adjust the load carrying length of each individual strap 1 and 10, in use.

The strap 1 is identical to the strap 10. The straps 1 and 10 have only one base portion each as at 4 and 5. Outwardly i.e. along the straps from the base portions 4 and 5 are side or intermediate portions 6, 7, 8 and 9. The portions 6, 7, 8 and 9 extend to the forearm handle portions 2 and 3.

The effective lengths of the straps 1 and 10 can be adjusted or varied at the forearm handles 2 and 3. The effective length of the straps may easily be varied with the size and configuration of the load to be carried. The use of the dozen forearm handles, i.e. three handles proximate each strap end enhances the ability to easily and quickly adjust the effective lengths of the straps, in use.

Dually in the parallel strap configuration 11 of FIG. 5, and "X" strap configuration 12 of FIG. 3, the straps extend outwardly at 6, 7, 8 and 9 from the base of the load being carried. The use differentiation between the base portions 4 and 5 (FIG. 3) and the side portions of the straps (FIG. 4) depends, as indicated above, on the sizes and configurations of the loads being carried as at 13 and 14.

The forearm handle portions 2 and 3 are adjustably secured to the user's forearms, just below the elbows 15, with arms from shoulder to elbow 16 and elbow to palms 17 jointly at about forty-five degree angles. See FIG. 6. The hands 18 and 19 are then freed to be used to enhance the load's stability, while being carried.

FIGS. 4 and 6 illustrate the use of the carrying strap apparatus' 1 and 10 in carrying a china cabinet and armoire, respectively, which, as is well known, are rather heavy and awkward loads to be carried. FIGS. 4 and 6 are perspective views showing the strap apparatus' 1 and 10 disposed about a china cabinet and armoire, respectively. FIGS. 3 and 5 are bottom plan views of the strap apparatus' 1 and 10 underneath the china cabinet and armoire, respectively.

In FIGS. 4 and 6, the strap apparatus' 1 and 10 are disposed underneath and centered relative to the load being carried. See also FIGS. 3 and 5. The side portions 6, 7, 8 and 9 of the straps 1 and 10 are then extended upwardly along the sides of the load. The forearm handle or entry portions are then chosen by users of the strap apparatus' 1 and 10 to carry the load.

The overall length of the strap apparatus' 1 and 10 may be determined by choosing one forearm entry 2 and 3 on each side of each strap 1 and 10 to provide the users with a convenient length of the strap apparatus' 1 and 10 to carry the object, whatever its size.

An armoire 14 and china cabinet 13 are relatively heavy and awkward in weight and size for carrying. With the strap apparatus' 1 and 10, the base portions 4 and 5 of the straps are disposed at the bottom (FIGS. 3 and 5) of the load when the load is in a vertical position as illustrated in FIGS. 4 and 6. The side strap portions 6, 7, 8 and 9 then extend to the forearm handles or entries 2 and 3 along the side of the load (FIGS. 4 and 6) so that the weight of the load itself helps to stabilized the load within the side strap portions.

Differently configured methods of use and loads are illustrated between FIGS. 3, 4, 5 and 6. FIGS. 3 and 4 also illustrate the "X" or cross-over strap configuration of use and a china cabinet as the load being carried. FIG. 3 is a bottom view taken generally along line 3—3 of FIG. 4 of the china cabinet 13, a generally heavy and awkward load to carry, shown disposed within the strap apparatus'. FIG. 4 is a perspective and elevational view of the china cabinet 13 within the carrying strap apparatus'.

FIGS. 5 and 6 also illustrate the parallel method of use with an armoire as the load being carried. FIG. 5 is a bottom view taken generally along line 5—5 of FIG. 6 of the armoire 14, a generally heavy and large load to carry. FIG. 6 is a perspective view of the armoire 14 within the carrying strap apparatus.

As indicated above, the strap apparatus' base portions 4 and 5 are disposed at the bottom and centered on the load to be carried, namely the armoire 14 in FIGS. 5 and 6. The side strap portions 6 and 7 of the straps 1 and 10 extend outwardly from the load being carried to opposite sides of the armoire 14 to the end forearm entries 2 and 3.

Once again, the weight of the armoire 14 helps to stabilize the armoire within the frame defined by the straps 1 and 10. Since the size and configuration of the armoire 14 differs substantially from the china cabinet 13, the size of the base portions of the straps and the side portions of the straps vary from the configurations of FIGS. 5 and 6 to that of FIGS. 3 and 4.

Again, as indicated above, the lengths of the straps may be adjusted at the forearm entries to conform to whatever size and configuration the load is to be carried and the size of the individuals carrying the load by the strap apparatus.

If desired, the carrying strap apparatus' 1 and 10 of the present invention may be adjusted. The adjustment of the length of the strap, or the strap portions, can be accomplished through choosing, as desired, one of the separate forearm entries 2 and 3 at the end of each opposite side of the straps 1 and 10.

The use of the strap apparatus' of the present invention 1 and 10 of FIGS. 1–6 with a dozen separate handle portions, is quicker, easier and more convenient than the use of the strap apparatus 22 of FIG. 7 with five buckles 23–27 and two straps 30 and 31 because it has no center buckle 25 nor four buckles 23, 24, 26 and 27 to adjust, but may be adjusted more efficiently. Rather, only the forearm entry portion 2 and 3 of choice needs to be selected. This is illustrated in FIG. 7.

FIG. 7 comprises a perspective view of carrying strap apparatus 22 which utilizes buckles and may be regarded as prior art. By comparison, the forearm furniture leverage straps 1 and 10 of FIGS. 1–6, are quicker and easier to use and the least expensive to manufacture, which is advantageous in many circumstances. For carrying items that are awkward, large and heavy, such as armoires, hutches, dressers and china cabinets and other kinds of furniture, especially in confined area, the forearm furniture leverage straps 1–10 of FIGS. 1–6 embodiment presents substantial advantages.

The strap apparatus' 1 and 10 are spaced apart relatively close to the ends of the item to be carried. The legs 20 and 21 of the item being carried secure the position of the straps 1 and 10 to the item 13 and 14 to safely and effectively be moved. The side portions 6, 7, 8 and 9 of the strap apparatus' are then disposed outwardly of the item to be carried.

These configurations FIGS. 3, 4, 5 and 6 provide stability for conveniently carrying items which are typically awkward to carry due to the lack of good hand holds, the size of the item to be carried and the sometimes confined areas to move them in.

While the principles of the invention have been made clear in illustrative embodiments, the appended claims are intended to cover and embrace modifications, within the limits of the true spirit and scope of the invention.

I claim:

1. Load carrying apparatus, comprising, in combination:
   a) first and second elongated straps having end portions,
   b) multiple loops at each end portion, and located in planes defined by said end portions and spaced along the length of the strap, to define multiple openings, located in said planes,
   c) each strap having a mid-portion located between said strap end portions, and mid-portions of the two straps located to extend under a load to be carried,
   d) whereby the user can select which of the loops is to be extended over his forearm, for lifting the load by lifting force exertion to lift said strap mid-portions.

2. The combination of claim 1 wherein said mid-portions extend in generally parallel relation.

3. The combination of claim 2 including the load extending over said parallel mid portion.

4. The combination of claim 3 wherein the straps extend upwardly at the sides of the load, and upward force is exerted via selected openings in said end portions.

5. The combination of claim 1 wherein said mid-portions extend in cross-over configuration.

6. The combination of claim 5 including the load extending over said cross-over mid-portions.

7. The combination of claim 6 wherein the straps extend upwardly at the sides of the load, and upward force is exerted via selected openings in said end portions.

8. The combination of claim 1 wherein the openings extend through the strap material, in thickness direction of the material.

9. The combination of claim 1 wherein there are at least three of said openings at at least one strap end portion.

10. The combination of claim 1 wherein there are at least three of said openings as follows:
   i) at the end portions of at least one strap,
   ii) at the end portions of both straps.

* * * * *